March 15, 1932. J. B. GALBRAITH 1,849,142
PIPE CUTTER
Filed Nov. 26, 1928
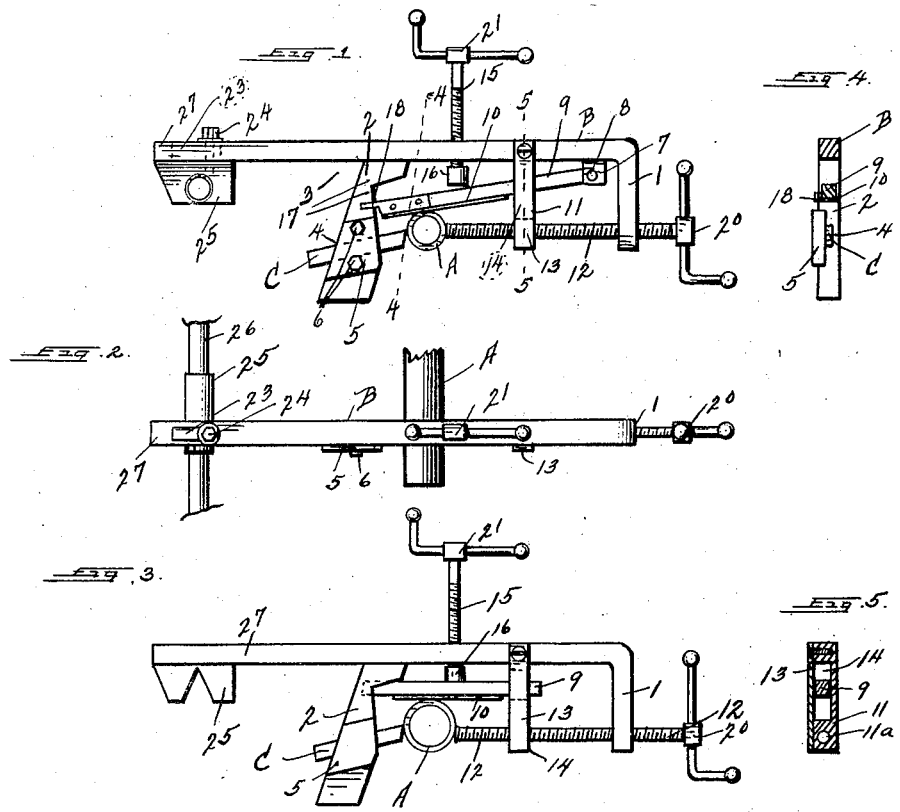
Inventor
Joseph B. Galbraith
By R. M. Thomas
Attorney Patented Mar. 15, 1932

1,849,142

UNITED STATES PATENT OFFICE

JOSEPH B. GALBRAITH, OF KAYSVILLE, UTAH

PIPE CUTTER

Application filed November 26, 1928. Serial No. 322,068.

My invention relates to pipe cutters and has for its object to provide a new and efficient device for cutting pipes when used in a rotary type of pipe handling machine.

A further object is to provide a new and efficient cutting off tool which can be used either in cutting pipe or other similar material in pipe handling machines or in cutting off material rotated by lathes.

A still further object is to provide a pipe cutting tool which may be used on any machine and which will not dull the cutting tool from much usage, thereby giving greater life to the cutting tools and eliminating expense to the operator.

These objects I accomplish with the device illustrated in the accompanying drawings in which similar numerals and letters of reference indicate like parts throughout the several views and as described in the accompanying specification and pointed out in the appended claims.

In the drawings in which I have shown the best and most preferred manner of building my invention, Figure 1 is a side elevation of the cutter in use. Figure 2 is a plan view thereof. Figure 3 is a modified form of constructing the adjusting plate. Figure 4 is a section on line 4—4 of Figure 1. Figure 5 is a section on line 5—5 of Figure 1.

In the drawings I have shown the pipe being cut as A, the main frame of the cutter as B, and the cutter blade as C. The cutter frame B is made of a piece of metal cast into the shape shown in the drawings. One end 1 thereof is formed downwardly to provide a bearing for a feed screw 12, and the medial portion of the casting is formed downwardly into a blade supporting portion 2, and a slanting cut 4 is made therein, in which the cutting blade C is placed. The cutting blade is held in place by the plate 5 and the tap screws 6. Near one end of the said frame B, I provide a boss 7, which is bored to receive a pivot pin 8 and a gauge bar 9 is pivoted thereto. The said gauge bar 9 is provided with a wearing plate 10 on the under side thereof and a guide and support frame 11 is formed on the bottom of the frame B, to guide the bar 9 and the plate 10 and said frame 11 is bored and threaded to receive and aid in supporting the feed screw 12. The said support frame 11 is channelled at 14, to receive the bar 9 and a guide plate 13 is secured on one side thereof to hold the bar 9 therein and to form one side of the guide frame 11. The feed screw 12 is placed through a threaded hole in the end of the end 1 and a hole 11a in the end of the guide frame 11 and is adapted to be screwed in either direction therethrough, to adjust the tension of the cutter blade C, in the pipe A, when the pipe is being cut off. An adjusting screw 15, is placed through a threaded hole through the main frame B and at right angles to the screw 12. The end 16 of the said screw is enlarged and rests upon the top side of the gauge bar 9 to force the bar 9 downwardly or to allow it to move upwardly depending upon the size of the pipe being cut off. Graduations 17 are formed on the side of the portion 2 and a finger 18 is secured on one side of the free end of the gauge bar 9, and when the gauge bar 9 is adjusted down or up by the movement of the screw 15, the graduations on the portion 2 indicate the size of pipe which the plate 10 will rest upon and the size of pipe which can be cut at each position of the plate 10. Handles 20 and 21 are provided on the free ends of the screws 12 and 15 respectively to provide means for rotating the screws. Figure 3 is a modified form of constructing the cutter with the bar 9 suspended in the guide cutter with the bar 9 cut in the face of the portion 2, with the channel 14 in the guide 11 shorter than in the other type cutter so that the bottom of the cut will act as a pivot point for the bar 9. The outer free end 27 of the body B is cut with an elongated slot 23 and a bolt 24 is passed therethrough and said bolt is secured in a bearing block 25. The said bearing block 25 is made of sufficient length to keep the tool from tipping when a pipe is being cut off, and the slot 23 provides for the entire cutter being adjustable longitudinally. A support bar 26 may be either a part of the machine on which the cutter is being used or the block 25 may be grooved on the bottom side as shown in Figure 3, and the block may then rest upon the bar without encircling it. In some types of cutting the block 25 may be dispensed with entirely and the end 27 of the body B rested upon any suitable support.

The operation of my cutter is as follows:

The cutter is placed on the bar 26 and then lowered down on the pipe to be cut. The gauge bar 9 is then adjusted by the screw 15 to the size of the pipe, and the device drawn to the pipe so that the cutting blade C is touching the outer periphery thereof, by rotating the screw 12. The pipe may then be rotated and as it rotates the operator gradually turns the screw 12 drawing the cutting blade C into the work, and the screw 15 may be turned as necessary to keep the cutter in the best cutting angle to the pipe. It will be obvious that the cutter could also be rotated around the pipe and the pipe held stationary.

Having thus described my invention I desire to secure by Letters Patent and claim:

1. In a cutter the combination of a body member; a cutting blade carried in a support thereon; guides depending from said body member to support a feed screw; a gauge bar pivoted under body member having a wearing plate secured thereon; and an adjustment screw passed through said body member and bearing upon the top side of said gauge bar to adjust the gauge bar to support the entire device above the work so that the cutter blade is at the correct angle to the work being done.

2. In a cutter the combination of a body; a cutting blade and a gauge bar supported thereunder; and adjustment screws adapted to draw the blade to the work, all arranged to engage the work at spaced points around the perimeter thereof and to retain the same correlative positions upon adjustments being made thereto.

In testimony whereof I have affixed my signature.

JOSEPH B. GALBRAITH.